INVENTOR.
E. WIEDEMANN

United States Patent Office 2,899,619
Patented Aug. 11, 1959

2,899,619

HOOK-UP FOR ALTERNATING CURRENT COMMUTATOR MOTOR-OPERATED LABORATORY CENTRIFUGES

Erwin Wiedemann, Riehen, near Basel, Switzerland, assignor, by mesne assignments, to Saul & Co., Newark, N.J., as nominee of Fidelity Union Trust Company, executive trustee under Sandoz trust Application September 6, 1955, Serial No. 532,407

Claims priority, application Switzerland September 6, 1954

3 Claims. (Cl. 318—269)

The present invention relates to a driving and braking control system for alternating current commutator motor-driven laboratory centrifuges, which system is particularly adapted to take care of the requirements of such centrifuges and to obviate operational failures.

Modern laboratory centrifuges with a capacity of up to about one liter and a maximum speed of about 15,000 revolutions per minute are—in so far as they are to be operated from the existing electrical current supply system—preferably driven by alternating current commutator motors, especially since their speed of rotation can be non-dissipatively regulated by a regulating transformer. Most commercial laboratory centrifuges of the aforesaid size and capacity in fact comprise a drive consisting of an alternating current commutator motor and a series-connected regulating transformer, as well as usually a time switch and protective means against overloading by operating of the machine at too high a speed.

A primary object of the present invention is to improve the electrical equipment of such machines in relatively simple manner and at small additional cost so that it is possible to effect an electrical braking action adapted to the conditions existing in the aforesaid type of centrifuge, whereby the stopping (running-out or slowing-down) time of the latter is shortened so that more efficient use of the machine can be made.

Apart from efficient operation, it is a desideratum of such electrical brakes that they operate smoothly and progressively, and that they be disengaged before the machine comes to a standstill, in order that no undesired stirring-up of the centrifuge sediment or residue may occur. The brakes should, moreover, be applicable in simple manner at any time, but should also permit unbraked stopping, i.e. free slowing-down, if desired.

Figure 1:
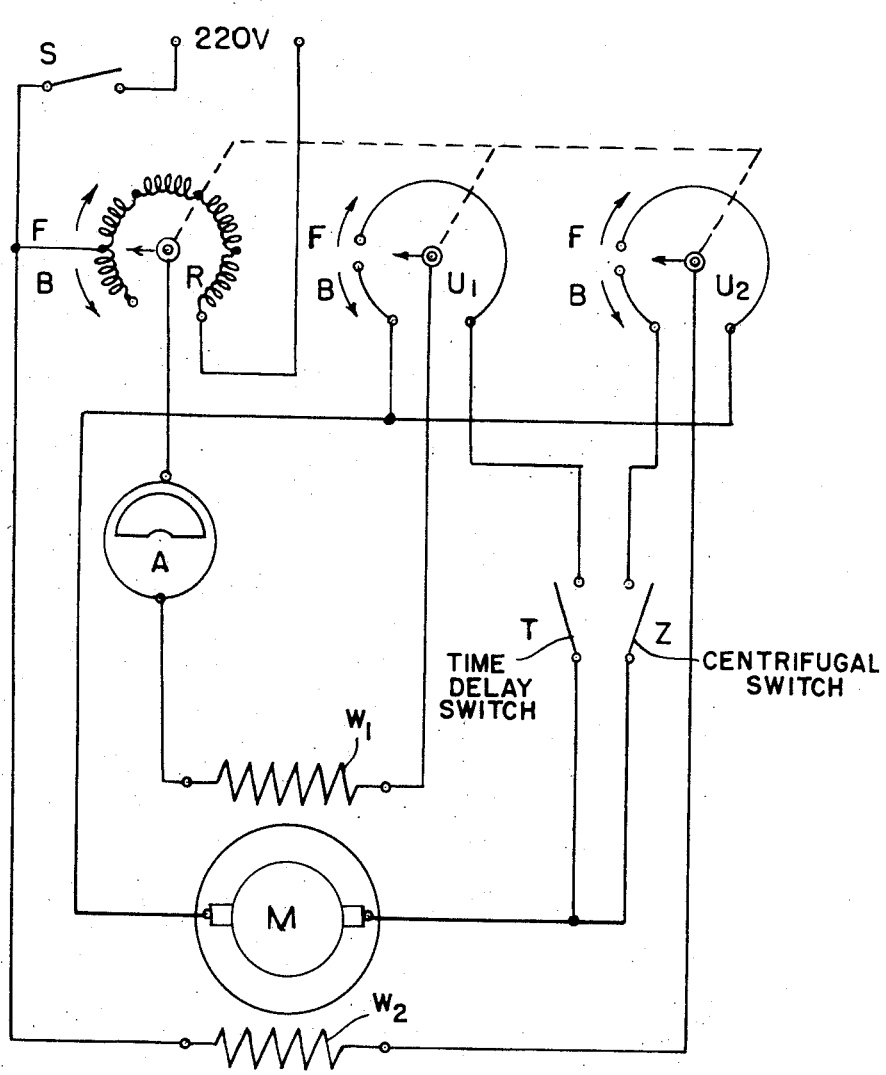
Figure 2:
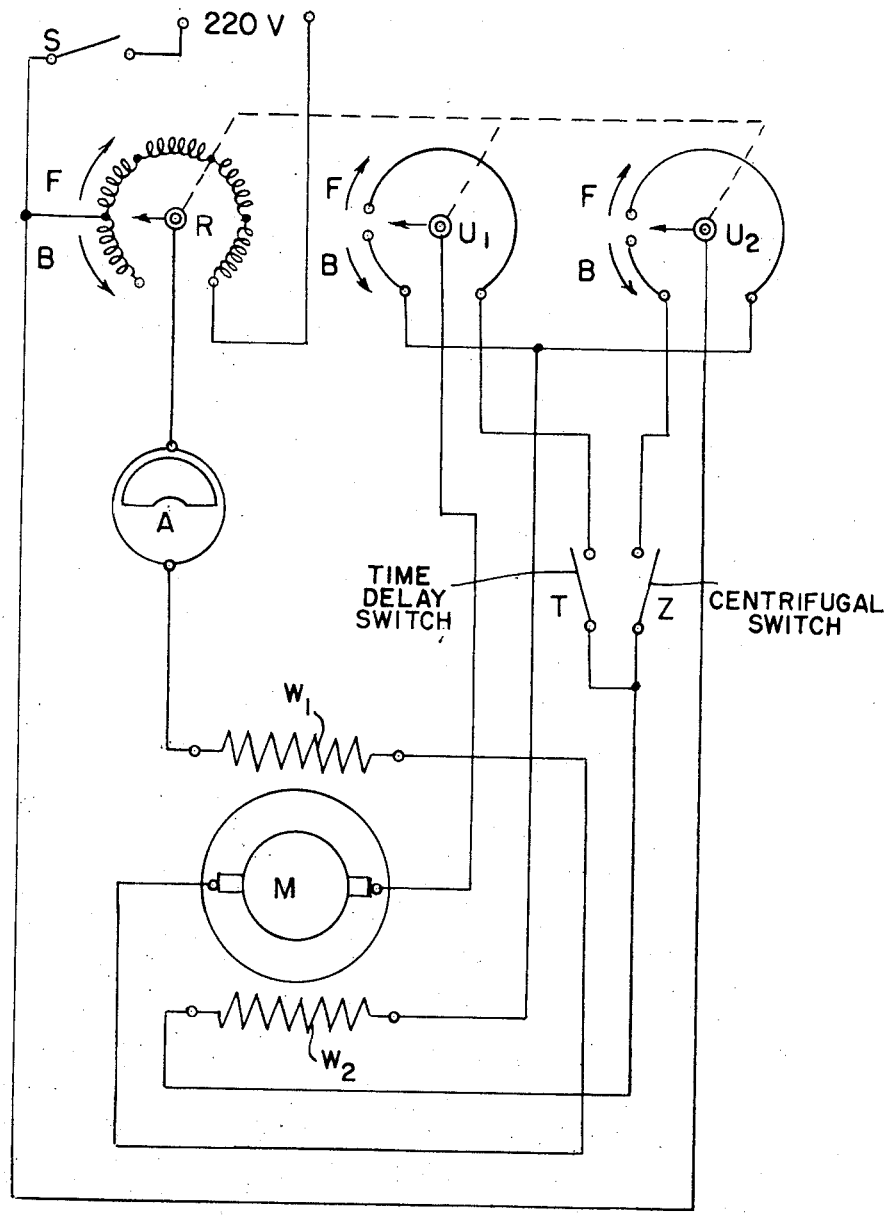

All these requirements are realized, according to the present invention, with the aid of electrical braking action based on reversal of the current in either the armature or the main series field winding of the driving motor. Presently-preferred embodiments for effecting such braking action are hereinafter described with reference to the accompanying drawings wherein:

Fig. 1 is a diagrammatic showing of one embodiment according to the invention, and Fig. 2 is a diagrammatic showing of an alternative embodiment.

The two embodiments are established on the same principle, differing essentially only in the particular type of braking involved. In the aforesaid figures of drawing, R is a hand regulated auto-transformer, the center tap of which is mechanically ganged (as indicated diagrammatically by a broken line) in a per se conventional manner to two changeover switches $U_1$ and $U_2$. The center tap of said auto-transformer R is electrically connected to the armature circuit of the motor M. In series with the armature circuit are two field windings $W_1$ and $W_2$, and ammeter A, a time delay switch T (labeled) of conventional construction, and a centrifugal switch Z (labeled), also of conventional construction. A switch S acts as a safety switch which opens if the motor M is overloaded. The time switch T may be set to interrupt the current in the armature circuit after a predetermined period of time. The switch Z is operated by the motor so as to be closed when the machine is running and to open when the speed of the machine falls below a certain value, as for example at below 500 r.p.m. of the shaft of motor M by which it is operated. The change-over switches $U_1$ and $U_2$ act as means for switching from running to braking. In the running range F, the armature of motor M is connected in series with both the field windings $W_1$ and $W_2$ by the switch T. In the braking range B, the motor is braked by either reversing the polarity of the armature of motor M with respect to the field windings (Fig. 1) or reversing the polarity of only one series field winding $W_2$ with respect to the armature of motor M and field winding $W_1$ (Fig. 2). Switch Z is connected in the braking circuit to stop the electrical braking below a certain speed.

Operation of the aforedescribed embodiments is as follows:

Initially switches T and Z are open and the regulating transformer R and the change-over switches $U_1$ and $U_2$ are in the zero or "off" position, illustrated. If now the switch S is closed and the regulating transformer R hand set to range B, no current will flow in the armature circuit because the switch Z is open, which prevents the motor from starting in the reverse direction. If, however, the switch T is closed and the regulating transformer R hand set to the range F, the motor starts.

If the switch T then opens after a predetermined interval of time, the machine slows down without braking. However, if the regulating transformer R is rotated to the range B after the end of the interval determined by the switch T, braking takes place because the switch Z is closed when the machine is running. This braking lasts until the switch Z opens shortly before the machine comes to a standstill. However, if regulating transformer R is previously rotated to the "off" position, there is no braking. The essential fact is that the braking current must be increased from zero to the maximum possible by rotating R even when the machine is already slowing down by reason of the switch T having been opened. This meets the requirement for shock-free braking. The requirement for braking to become ineffective shortly before standstill is also met, since the switch Z opens shortly before standstill is reached. However, the running condition can also be restored during braking. For this purpose only the switch T has to be closed, and the regulating transformer R rotated from the range B to range F. This transition also takes place progressively and without shock. Simplicity of operation is ensured in all these manipulations by the fact that only the knob of the regulating transformer R has to be actuated.

The present system thus affords the operator the greatest freedom in controlling the machine with maximum security of operation and best adaptation to the requirements of laboratory centrifuges. The said system also presents considerable advantages in practical use, since the ratio of driving performance to braking performance is freely selectable within a relatively wide range. For general laboratory purposes, it is advantageous to correleate the maximum driving voltage to the maximum braking voltage—for instance, for the arrangement according to Fig. 2—in the ratio of about 5:1; this reduces the running-out (stopping) time by about half, a magnitude which is permissible even with specifically light sediments. Thus, e.g. with an r.p.m. of 14,300 and a driving voltage of 210 volts and a driving current of 1.55 amperes, the running-out (stopping) time is 4 minutes and 45 seconds, whereas with electrical braking according to the present invention, using a braking voltage of 37 volts and 0.9 ampere current, the running-out time is 2 minutes and 30 seconds, the said figures being average values with the arrangement according to Fig. 2.

Having thus disclosed the invention, what is claimed is:

1. A circuit for running and braking an alternating current commutator motor comprising a transformer having a secondary winding with a fixed takeoff at a predetermined number of turns from one end of the secondary winding and a continuously movable takeoff movable over the whole of the secondary winding, an alternating current commutator motor having stator and armature windings, said movable takeoff being connected to one of said stator windings, said one of said stator windings being connected to the other windings, one of the remaining windings being a winding in which the current flow is to be reversed to brake the motor, a first and a second changeover switch each having a rotatable member and two curved contacts the ends of which are spaced from each other, said rotatable members being mechanically connected to said movable takeoff for movement therewith with the position of the rotatable members at the space between said contacts corresponding to the positioning of the movable takeoff at the fixed takeoff on said transformer, one contact on the first changeover switch being connected to one side of the winding in which current flow is to be reversed, the other contact on said first changeover switch being connected to the other side of the winding in which the current flow is to be reversed, and the rotatable contact on the first changeover switch being connected to at least one of the other windings of the motor, a time delay switch in the connection between said one contact on the first changeover switch and the winding in which the current flow is to be reversed, one contact on the second changeover switch being connected to the other contact on the first changeover switch, the other contact on the second changeover switch being connected to the winding in which the current flow is to be reversed, a centrifugal switch actuated by the rotor of said motor in the connection between the other contact of the second changeover switch and the winding in which the current flow is to be reversed, and the rotatable contact on said second changeover switch being connected to the fixed takeoff on said transformer.

2. A circuit for running and braking an alternating current commutator motor comprising a transformer having a secondary winding with a fixed takeoff at a predetermined number of turns from one end of the secondary winding and a continuously movable takeoff movable over the whole of the secondary winding, an alternating current commutator motor having two stator windings and an armature winding, said movable takeoff being connected to one of said stator windings, said one of said stator windings being connected to the armature winding, the other stator winding being a winding in which the current flow is to be reversed to brake the motor, a first and a second changeover switch each having a rotatable member and two curved contacts the ends of which are spaced from each other, said rotatable members being mechanically connected to said movable takeoff for movement therewith with the position of the rotatable members at the space between said contacts corresponding to the positioning of the movable takeoff at the fixed takeoff on said transformer, one contact on the first changeover switch being connected to one side of the other stator winding, the other contact on said first changeover switch being connected to the other side of the other stator winding, and the rotatable contact on the first changeover switch being connected to the armature winding, a time delay switch in the connection between said one contact on the first changeover switch and the other stator winding, one contact on the second changeover switch being connected to the other contact on the first changeover switch, the other contact on the second changeover switch being connected to the other stator winding, a centrifugal switch actuated by the rotor of said motor in the connection between the other contact of the second changeover switch and the other stator winding, and the rotatable contact on said second changeover switch being connected to the fixed takeoff on said transformer.

3. A circuit for running and braking an alternating current commutator motor comprising a transformer having a secondary winding with a fixed takeoff at a predetermined number of turns from one end of the secondary winding and a continuously movable takeoff movable over the whole of the secondary winding, an alternating current commutator motor having two stator windings and an armature winding, said movable takeoff being connected to one of said stator windings, said armature winding being a winding in which the current flow is to be reversed to brake the motor, a first and a second changeover switch each having a rotatable member and two curved contacts the ends of which are spaced from each other, said rotatable members being mechanically connected to said movable takeoff for movement therewith with the position of the rotatable members at the space between said contacts corresponding to the positioning of the movable takeoff at the fixed takeoff on said transformer, one contact on the first changeover switch being connected to one side of the armature winding, the other contact on said first changeover switch being connected to the other side of the armature winding, and the rotatable contact on the first changeover switch being connected to said one stator winding, a time delay switch in the connection between said one contact on the first changeover switch and the armature winding, one contact on the second changeover switch being connected to the other contact on the first changeover switch, the other contact on the second changeover switch being connected to the armature winding, a centrifugal switch actuated by the rotor of said motor in the connection between the other contact of the second changeover switch and the armature winding, and the rotatable contact on said second changeover switch being connected to the other stator winding, and the other stator winding being connected to the fixed takeoff on said transformer.

References Cited in the file of this patent

UNITED STATES PATENTS

| | | |
|---|---|---|
| 869,356 | Fiedler | Oct. 29, 1907 |
| 921,642 | Darlington | May 11, 1909 |